United States Patent
Gonzalez et al.

(10) Patent No.: US 11,379,646 B1
(45) Date of Patent: Jul. 5, 2022

(54) SYSTEM, METHOD, AND COMPUTER PROGRAM PRODUCT FOR DETERMINING COMPUTATIONAL REQUIREMENTS OF A PRINTED CIRCUIT BOARD DESIGN

(71) Applicant: Cadence Design Systems, Inc., San Jose, CA (US)

(72) Inventors: Jorge Alejandro Gonzalez, Brookline, MA (US); Shang Li, Wakefield, MA (US); Luke Roberto, Brookline, MA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/002,976

(22) Filed: Aug. 26, 2020

(51) Int. Cl.
*G06F 30/392* (2020.01)
*G06N 20/00* (2019.01)
*G06F 30/394* (2020.01)

(52) U.S. Cl.
CPC .......... *G06F 30/392* (2020.01); *G06F 30/394* (2020.01); *G06N 20/00* (2019.01)

(58) Field of Classification Search
CPC .. G06F 30/392; G06F 30/394; G06F 2115/12; G06N 20/00; G06N 3/08
See application file for complete search history.

(56) References Cited

U.S. PATENT DOCUMENTS

| | | | |
|---|---|---|---|
| 11,055,639 B1* | 7/2021 | Cay | G06Q 10/04 |
| 2019/0220381 A1* | 7/2019 | Pogorelik | G06K 9/6262 |
| 2019/0236240 A1* | 8/2019 | Huang | G06F 11/263 |
| 2020/0104458 A1* | 4/2020 | Chuang | G06F 30/398 |
| 2021/0010953 A1* | 1/2021 | Adler | H05K 3/4038 |
| 2021/0073968 A1* | 3/2021 | Liu | G06N 20/00 |

* cited by examiner

*Primary Examiner* — Nha T Nguyen
(74) *Attorney, Agent, or Firm* — Mark H. Whittenberger, Esq.; Holland & Knight LLP (57) ABSTRACT

The present disclosure relates to electronic circuit design, and more specifically, to determining the computational requirements of fully synthesizing a printed circuit board and/or package. Embodiments may include receiving, using a processor, one or more PCB electronic design files and determining whether the PCB electronic design files include data required for a synthesis engine. If any data is missing, the method may include inferring one or more parameters using an inference engine and providing the one or more parameters to the synthesis engine, wherein the synthesis engine includes at least one of a placement, via assignment, routing, and metal pouring processes. The method may also include collecting process data from the placement, via assignment, routing, and metal pouring processes and training a machine learning system using the process data.

20 Claims, 9 Drawing Sheets

SYSTEM, METHOD, AND COMPUTER PROGRAM PRODUCT FOR DETERMINING COMPUTATIONAL REQUIREMENTS OF A PRINTED CIRCUIT BOARD DESIGN

GOVERNMENT RIGHTS

This invention was made with Government support under Agreement No. HR0011-18-3-0010, awarded by DARPA. The Government has certain rights in the invention.

FIELD OF THE INVENTION

The present disclosure relates to electronic circuit design, and more specifically, to determining the computational requirements of fully synthesizing a printed circuit board and/or package.

DISCUSSION OF THE RELATED ART

Electronic Design Automation (EDA) processes, such as automatic component placement, routing, system analysis and simulation, are often compute-intensive and time consuming. They also typically employ different optimization techniques such as simulated annealing, genetic optimization, analytical algorithms or neural networks. The heterogeneity and complexity of these EDA processes makes it very difficult to predict the time and computing resources needed to run the job.

Traditionally EDA processes, packaged in EDA software, run on workstations or servers in an enterprise environment as they require frequent human interactions such as seeking inputs and observing outputs. In this environment, the compute resources are limited to the machine that the process is running on, and human designers are required to tune the parameters of the EDA processes to control their runtime and performance. This often requires experienced designers as EDA processes are complicated and may employ different optimization techniques internally. For example, one EDA process that uses simulated annealing will have very different characteristics than another EDA process that uses genetic optimization. The inputs of EDA processes will also dictate how long the process is going to run. For example, larger/more complex designs will typically take more time to finish.

Recent developments in EDA fields, are pushing the EDA processes to be fully automated with as little human involvement as possible. This will allow EDA processes to be deployed on cloud computing environments as services since they do not require frequent human interactions anymore. A cloud computing environment can dynamically allocate compute resources on demand. The monetary cost of cloud is usually proportional to the computing resources allocated. So ideally, when an EDA process is deployed to the cloud, the compute resources allocated will have to be optimal so that the process is not starved by resources but also does not introduce unnecessary cost.

SUMMARY

In one or more embodiments of the present disclosure a computer-implemented method associated with a printed circuit board ("PCB") design is provided. The method may include receiving, using a processor, one or more PCB electronic design files and determining whether the PCB electronic design files include data required for a synthesis engine. If any data is missing, the method may include inferring one or more parameters using an inference engine and providing the one or more parameters to the synthesis engine, wherein the synthesis engine includes at least one of a placement, via assignment, routing, and metal pouring process. The method may also include collecting process data from the placement, via assignment, routing, and metal pouring processes and training a machine learning system using the process data.

One or more of the following features may be included. The process data from the placement process may include at least one of a number of components, a number of connections, a number of cores, a board area, and a sum of component footprints. The process data from the via process may include at least one of a number of connections, a number of layers, and a number of cores. The process data from the routing process may include at least one of a number of connections, a number of layers, and a number of cores. The process data from the metal pouring process may include at least one of a board area, a number of power and ground nets, a number of power and ground layers, and a number of cores. Receiving may include receiving one or more of a netlist, a component library, a board outline, and a rules file. Data required for a synthesis engine may include at least one of a netlist, a board outline, a component library, a layer stackup, and one or more rules associated with signal integrity, clearances, and trace widths. The one or more parameters may include at least one of a maximum time limit, a maximum iteration limit, a number of cores or machines required, and other process-specific parameters.

In yet another embodiment of the present disclosure a non-transitory computer-readable storage medium having stored thereon instructions, which when executed by a processor result in one or more operations is provided. Operations may include receiving, using a processor, one or more PCB electronic design files and determining whether the PCB electronic design files include data required for a synthesis engine. If any data is missing, operations may include inferring one or more parameters using an inference engine and providing the one or more parameters to the synthesis engine, wherein the synthesis engine includes at least one of a placement, via assignment, routing, and metal pouring process. Operations may also include collecting process data from the placement, via assignment, routing, and metal pouring processes and training a machine learning system using the process data.

One or more of the following features may be included. The process data from the placement process may include at least one of a number of components, a number of connections, a number of cores, a board area, and a sum of component footprints. The process data from the via process may include at least one of a number of connections, a number of layers, and a number of cores. The process data from the routing process may include at least one of a number of connections, a number of layers, and a number of cores. The process data from the metal pouring process may include at least one of a board area, a number of power and ground nets, a number of power and ground layers, and a number of cores. Receiving may include receiving one or more of a netlist, a component library, a board outline, and a rules file. Data required for a synthesis engine may include at least one of a netlist, a board outline, a component library, a layer stackup, and one or more rules associated with signal integrity, clearances, and trace widths. The one or more parameters may include at least one of a maximum time limit, a maximum iteration limit, a number of cores or machines required, and other process-specific parameters.

In one or more embodiments of the present disclosure a system associated with a printed circuit board ("PCB") design is provided. The system may include a processor configured to receive one or more PCB electronic design files and to determine whether the PCB electronic design files include data required for a synthesis engine. If any data is missing, the processor may be further configured to infer one or more parameters using an inference engine. The processor may be further configured to provide the one or more parameters to the synthesis engine, wherein the synthesis engine includes at least one of a placement, via assignment, routing, and metal pouring process. The processor may be further configured to collect process data from the placement, via assignment, routing, and metal pouring processes. The processor may be further configured to train a machine learning system using the process data.

One or more of the following features may be included. The process data from the placement process may include at least one of a number of components, a number of connections, a number of cores, a board area, and a sum of component footprints. The process data from the via process may include at least one of a number of connections, a number of layers, and a number of cores. The process data from the routing process may include at least one of a number of connections, a number of layers, and a number of cores. The process data from the metal pouring process may include at least one of a board area, a number of power and ground nets, a number of power and ground layers, and a number of cores. Receiving may include receiving one or more of a netlist, a component library, a board outline, and a rules file.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Embodiments of the present disclosure are directed towards systems and methods configured to determine the computational requirements of fully synthesizing a printed circuit board and/or package. Some embodiments are configured to utilize a data callback framework. The data callback framework may be configured to extract one or more features that contribute to the computational requirements of a synthesis process, as well as the time it took to run, and train a machine learning model to predict the computational requirements of new designs. Features and time-to-run data may be extracted during some or all of the runs of the synthesis process as is discussed in further detail hereinbelow.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C' or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

One or more hardware description languages may be used in accordance with the present disclosures. Some hardware description languages may include, but are not limited to, Verilog, VHDL, SystemC, SystemVerilog and Verilog-AMS. Various other hardware description languages may also be used as well.

Figure 1:
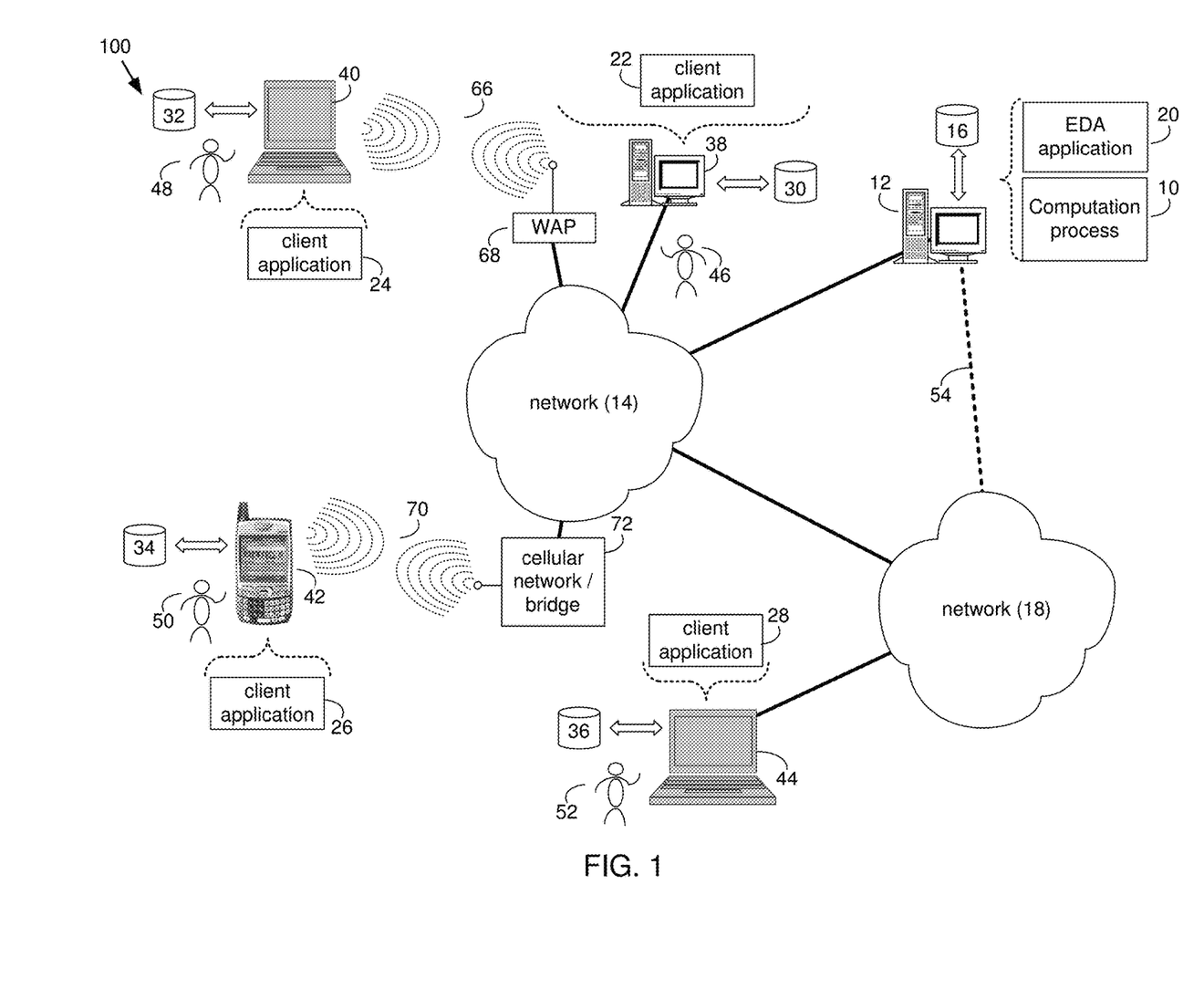
FIG. 1 is a diagram depicting an embodiment of a system in accordance with the present disclosure.

Referring to FIG. 1, there is shown a computation process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, computation process 10 may reside on and be executed, in whole or in part, by a client electronic device, such as a personal computer, notebook computer, personal digital assistant, or the like.

The instruction sets and subroutines of computation process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (e.g., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization.

Computation process 10 may be a standalone application, or may be an applet/application/script that may interact with and/or be executed within EDA application 20. In addition/ as an alternative to being a server-side process, computation process 10 may be a client-side process (not shown) that may reside on a client electronic device (described below) and may interact with an EDA client application (e.g., one or more of EDA client applications 22, 24, 26, 28). Further, computation process 10 may be a hybrid server-side/client-side process that may interact with EDA application 20 and an EDA client application (e.g., one or more of client applications 22, 24, 26, 28). As such, computation process 10 may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize computation process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (e.g., the computer that executes EDA application 20) may be connected to network 14 through secondary network 18, as illustrated with phantom link line 54. Some or all of the operations discussed herein with regard to computation process 10 may be performed, in whole or in part, in the cloud as a cloud-based process including, for example, networks 14, 18 and any others.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (e.g., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (e.g., CSMA/CA) for path sharing. The various 802.11x specifications may use phase-shift keying (e.g., PSK) modulation or complementary code keying (e.g., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.)

Figure 2:
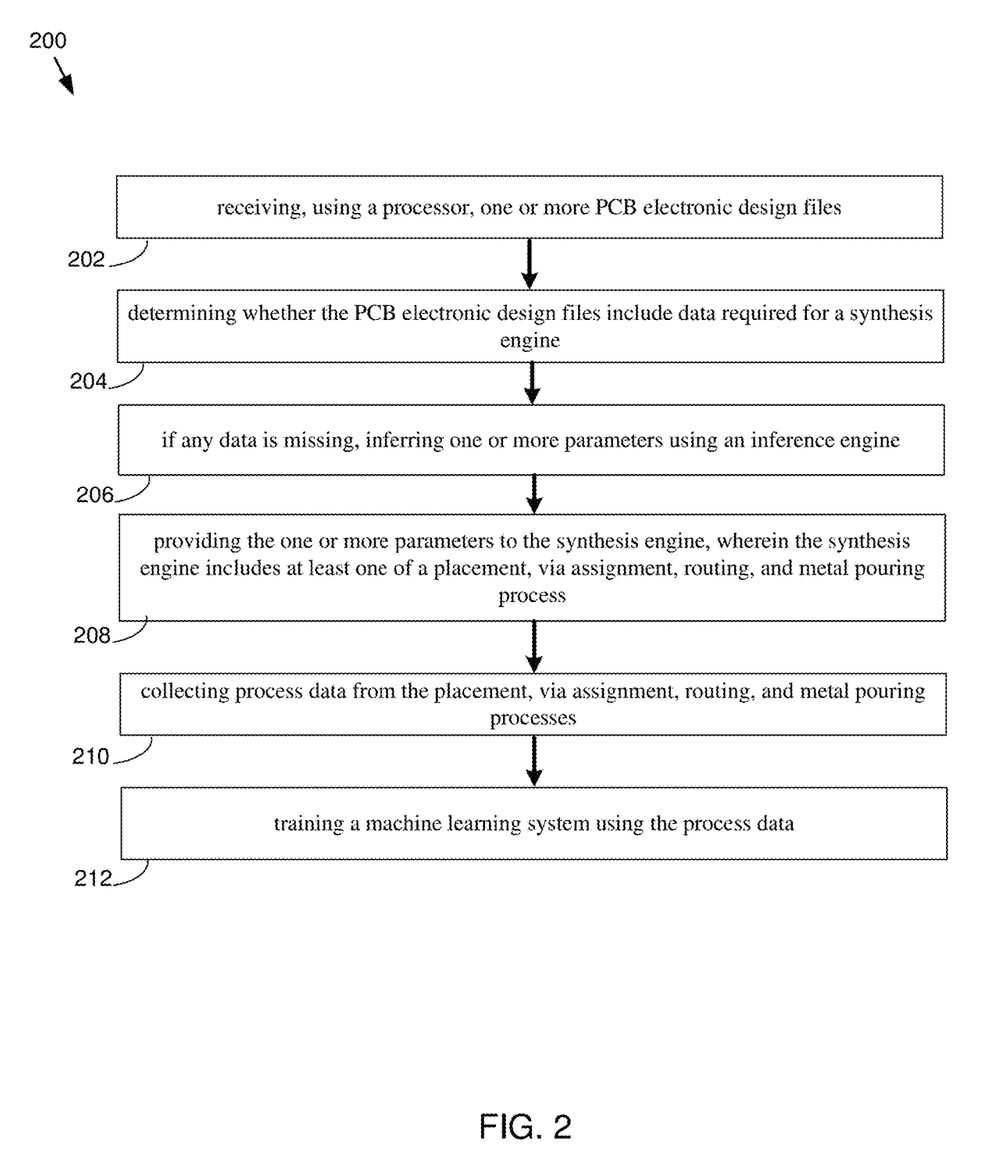
FIG. 2 is a flowchart depicting operations consistent with the computation process in accordance with embodiments of the present disclosure.

Referring now to FIG. 2, an exemplary flowchart 200 depicting operations for use in accordance computation process 10 is provided. Embodiments may include receiving (202), using a processor, one or more PCB electronic design files and determining (204) whether the PCB electronic design files include data required for a synthesis engine. The method may further include if any data is missing, inferring (206) one or more parameters using an inference engine. The method may also include providing (208) the one or more parameters to the synthesis engine, wherein the synthesis engine includes at least one of a placement, via assignment, routing, and metal pouring process. The method may further include collecting (210) process data from the at least one placement, via assignment, routing, and metal pouring process. The method may also include training (212) a machine learning system using the process data. Numerous other operations are also within the scope of the present disclosure.

Figure 3:
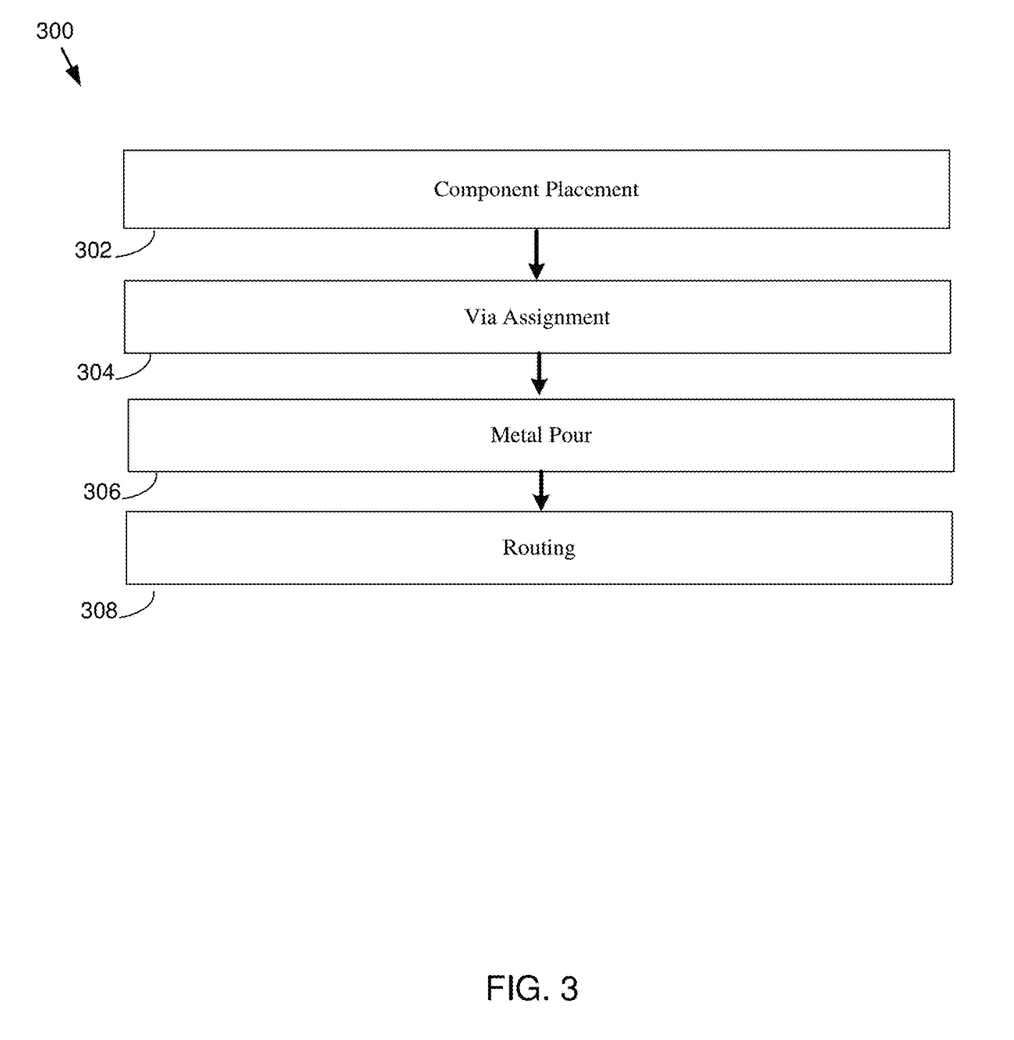
FIG. 3 is a flowchart depicting an example of PCB/Package synthesis in accordance with an embodiment of the present disclosure.
Figure 4:
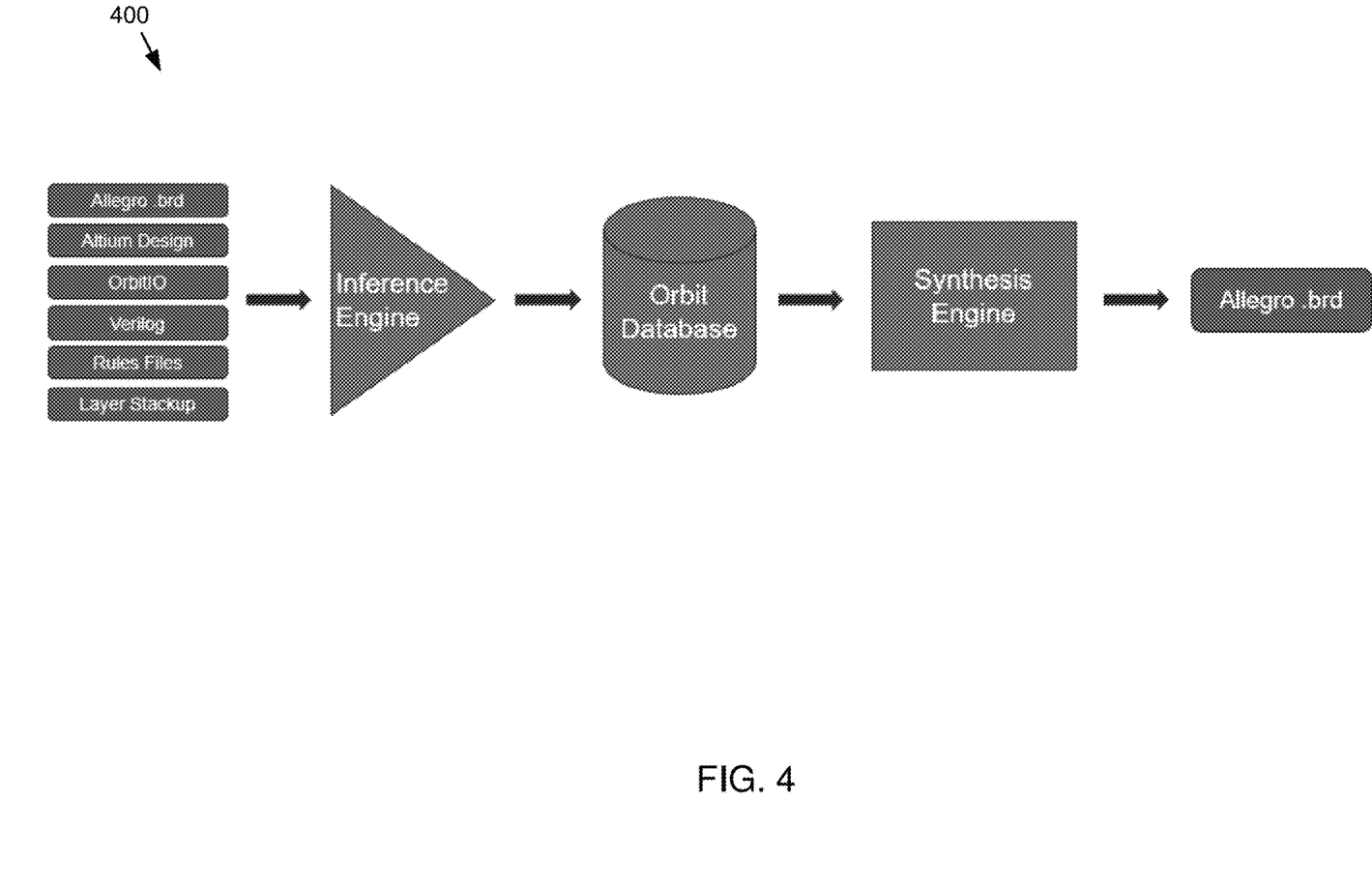
FIG. 4 is a flowchart depicting another example flow of computation process in accordance with an embodiment of the present disclosure.
Figure 5:
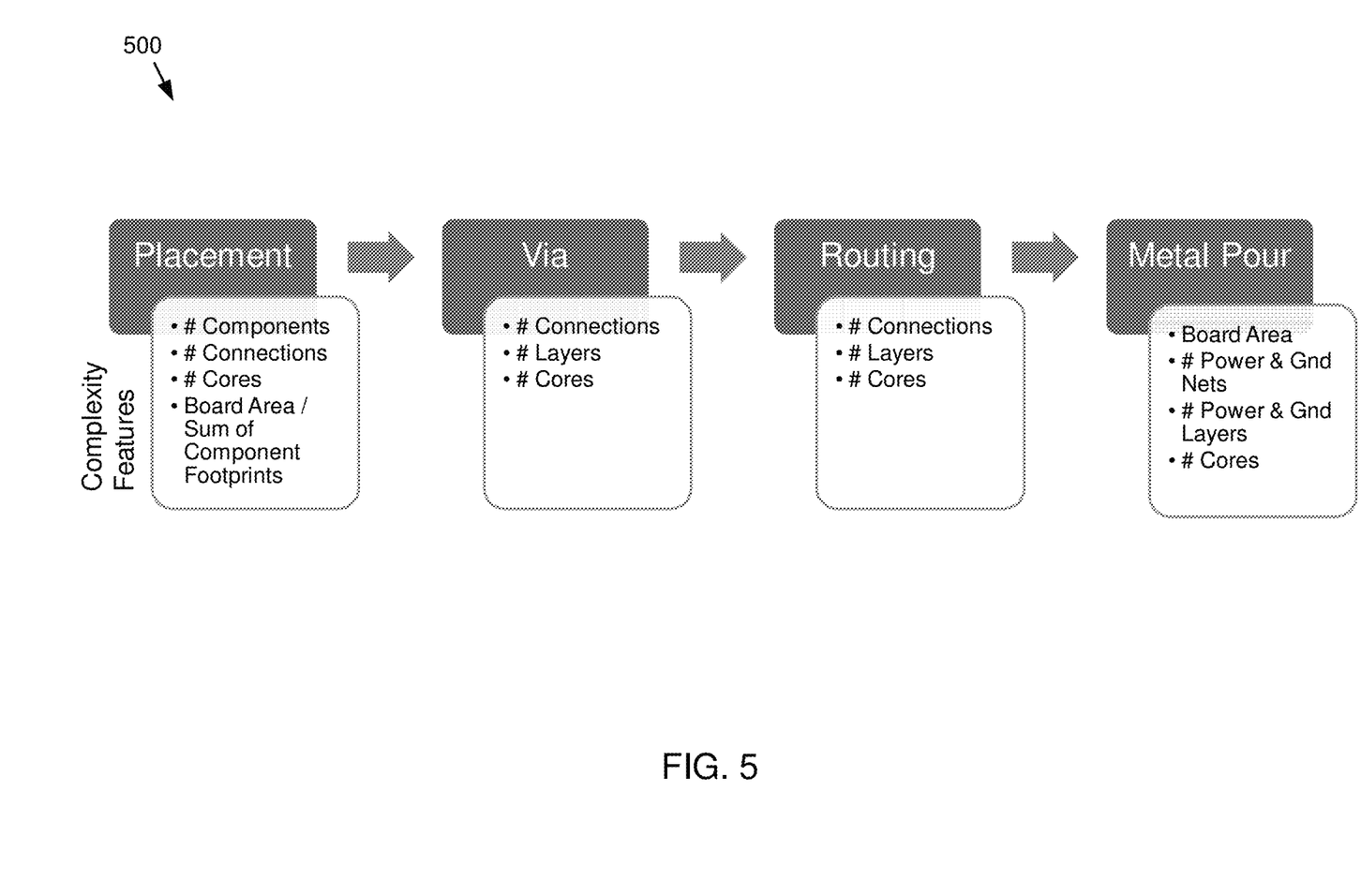
FIG. 5 is a flowchart depicting another example flow of a synthesis engine in accordance with an embodiment of the present disclosure.

Referring now to FIGS. 3-5, embodiments of computation process 10 may be configured to determine the computational requirements of fully synthesizing a PCB and/or package. Fully synthesizing a PCB and/or package in an EDA process may include, but is not limited to, a PCB/Package synthesis tool and, more specifically, a no-human-in-the-loop (NHIL) PCB/Package synthesis tool. For example, when using a NHIL PCB/Package synthesis tool, determining the complexity and computational requirements of fully synthesizing a PCB or package using is an extremely difficult task. The complexity and computational requirements may depend on various factors such as the number of components, nets, rules, layer stackup, and board area, etc.

The complexity and computational requirements may correspond to the monetary costs to fully synthesize a PCB and/or package. Estimating the computational cost of a new design is important because these costs directly determine the financial cost of synthesizing a new PCB or package. Estimating the cost is necessary so that the user may decide if full synthesis is financially feasible. Currently, no approach exists for quantitatively estimating the compute cost of a new design created by PCB/Package synthesis processes.

The synthesis process may be unique for each design and computationally expensive and complex. For example, an NHIL PCB/Package synthesis tool may fully automate the placement, via assignment, power plane generation, routing, and analysis of PCBs and/or packages. NHIL PCB/Package synthesis tools may include cloud native applications that leverage off-site computational resources to optimize each design. Cloud computing environments may provide resources that are available on-demand and cost metered based on resources used.

In some embodiments, computation process 10 may characterize the inputs of the EDA processes; characterize instruments and their compute resources and runtime; collect such data as a training dataset; and train machine learning models on the dataset. The trained machine learning model may predict the compute resources and time needed given a new input of the EDA process.

In some embodiments, computation process 10 may deploy systems and methods as a provisioning and/or scheduling system in a cloud computing environment where compute resources are on-demand and metered. This may allow the users who need to run the EDA processes on the cloud both the knowledge of the compute resources time, and subsequently, the monetary cost before they actually run the job. This system may also help maximize the efficiency of compute resources on the cloud by provisioning resources accurately rather than relying on human inputs. In this way, computation process 10 may automate compute resource provisioning by relying on the characteristics of the input of EDA processes rather than any human input.

In some embodiments, computation process 10 may utilize the limited scope of each EDA process and extract the characteristics of the inputs to the jobs and/or processes. For example, in PCB automation jobs, inputs may include, but are not limited to, features such as the board area, number of layers, and the number of connections. These features provide more insight to the complexity of the inputs without relying on any human inputs. Moreover, because these features are the characteristics inherently describing the inputs, they may be used for all related EDA processes. For example, board area, number of layers, and number of connections can be used for predicting both the placement process and routing process.

Referring again to FIG. 3, a flowchart 300 depicting an example of a PCB/Package synthesis engine is provided. In some embodiments, the synthesis engine may fully automate PCB design synthesis and it may be configured to operate, either wholly or partly in a cloud environment such as those shown in FIG. 1. A graphical user interface may be presented to end users as a web service or using any other suitable approach.

In some embodiments, a full synthesis process may include, but is not limited to, component placement 302, via assignment 304, routing 306, and metal pour 308 operations. Each of these may include one or more machine learning enabled algorithms associated therewith that complete the PCB design synthesis flow. Component placement 302 may include the placement of components on the board. Via assignment 304 may include the addition and assignment of vias to the board. Routing 306 may include signal routing. Metal pour 308 may include power and ground plane generation. The time-to-run of each step of a full synthesis may be determined by computation process 10. A variety of factors may be extracted by computation process 10 during the full synthesis. Additional examples of factors that could be extracted are also described with reference to FIG. 5.

Referring now to FIG. 4, flowchart 400 depicting an example flow of computation process 10 is provided. In some embodiments, computation process 10 may provide as an input a variety of different standard PCB design files. Some of these may include, but are not limited to, a PCB design file (e.g., .brd file), an ASCII file (e.g., .PCBDOC file), a standard design file associated with a system planner (e.g., .oio file), or a source code netlist file (e.g., Verilog) and corresponding component library, board outline, and/or rules files.

In some embodiments, regardless of the inputs, and before the optimization process begins, computation process 10 may check to ensure the data necessary for synthesis is present. In some embodiments, necessary data may include, but is not limited to, a netlist, board outline, component library, layer stackup, and one or more rules relating to signal integrity, clearances, and trace widths. If any information is missing, an inference engine may be used to infer the missing data. The inference engine may leverage a model that scrapes designs to correlate given information with missing features. In some embodiments, the inference engine many utilize hundreds of designs to correlate the given information with the missing features. Once all necessary data is uploaded or inferred the optimization process begins and the design may be synthesized and a design file may be generated (such as a .brd file).

Referring now to FIG. 5, a flowchart 500 depicting an example of a synthesis engine is provided. The synthesis engine may be composed of multiple processes, some of which may include, but are not limited to, placement, via, routing, and metal pour. The synthesis engine may utilize one or more machine learning algorithms to aid in optimizing design synthesis. Each step of the synthesis process may include a complex joint optimization problem whose computational requirements may be dependent on a variety of features. For example, some features may include, but are not limited to, number of components, nets, rules, layer stackup, and board area. The synthesis engine may utilize other features that the machine learning algorithms may include as an input, output, and/or temporary variables in the complex joint optimization problem. Additional information regarding training and utilizing a machine learning algorithm in PCB synthesis may be found in application Ser. No. 16/785,972, which is incorporated herein by reference in its entirety.

During each of these processes, data may be extracted. The data may include features, and these features may include input variables, output variables, temporary variables, and/or properties from the processes in the synthesis engine. The extracted data may be used to train a system to make runtime predictions when the system encounters new designs. The data extracted from each process varies, and as the synthesis engine is expanded and the complexity of designs increases, the data that is extracted will expand.

In some embodiments, the extracted data may be chosen to correspond to the complexity of the synthesis process. As such the extracted data may include a complexity feature. The phrase "complexity feature", as used herein, may refer to a feature, input or variable of a procedure or step within the synthesis process that may have a relationship to the complexity of the design synthesis. The complexity of the design synthesis has a relationship to the time to complete the synthesis and thus also a relationship to the cost to run the synthesis.

In some embodiments, and referring also to FIG. 5, a flowchart showing particular examples of complexity features is provided. Specifically, in the placement process of PCB and/or package synthesis, computation process 10 may extract the number of components, the number of connections, the number of cores, the board area, the sum of the component footprints, etc. Similarly, in the via process of PCB and/or package synthesis, computation process 10 may extract the number of connections, the number of layers, the number of cores, etc. In the routing process of PCB and/or package synthesis, computation process 10 may extract the number of connections, the number of layers, and the number of cores, etc. In the metal pour process of PCB and/or package synthesis, computation process 10 may extract the board area, the number of power and ground nets, the number of power and ground layers, the number of cores, etc.

While the data to be extracted for the Placement, Via, Routing, and Metal Pour processes is explicitly outlined, this framework is expandable to other processes. Other processes may include, but are not limited to, systems to analyze designs to ensure design closure with respect to thermal, signal integrity, and power integrity constraints. Similarly, this framework can be expanded to extract new features from existing processes. This flexibility is important as the synthesis process may continue to be developed to expand to support new and more complex designs. Therefore, computation process 10 may also be flexible to provide the computational requirements for synthesizing boards.

Figure 6:
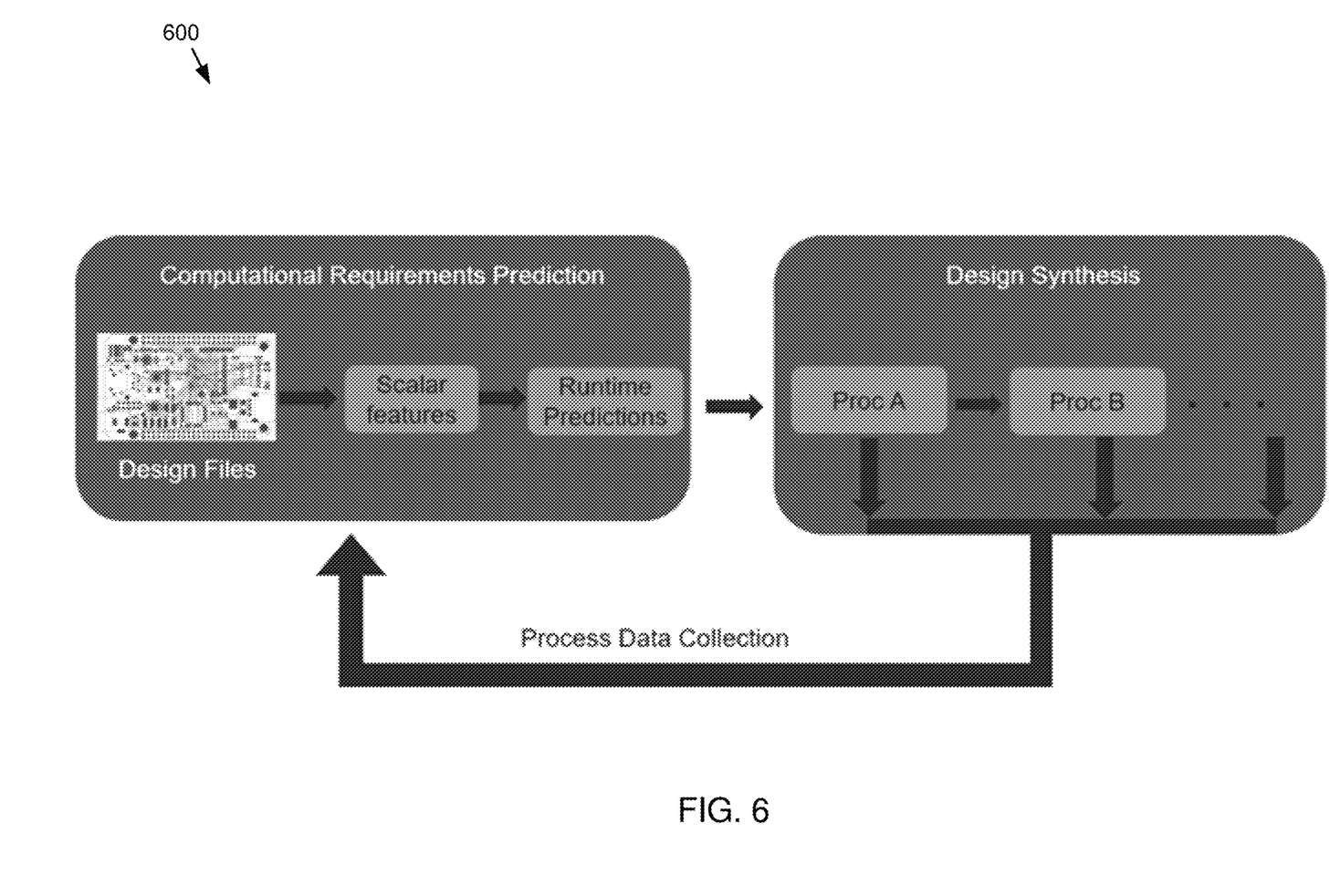
FIG. 6 is a flowchart depicting an example of data callback framework interactions in accordance with an embodiment of the present disclosure.

Referring now to FIG. 6, a flowchart 600 depicting an example of data callback framework interactions is provided. Flowchart 600 includes computational requirements prediction, design synthesis, and process data collection. Within design synthesis, each step for synthesizing a PCB and/or package may include a series of steps or procedures (e.g. Proc A, Proc B) including, for example, the processes in the synthesis engine depicted flowchart 500 (e.g. Placement, Via, Routing, and Metal Pour processes). Each step for synthesizing a PCB and/or package may include one or more complexity features.

In some embodiments, process data collection may provide information extracted from design synthesis to computational requirements prediction. Process data collection may include extracting data from Proc A and/or Proc B. The extracted data may be chosen to represent a complexity feature of the synthesis process (e.g., complexity features in FIG. 5).

In some embodiments, process data collection may include a data callback framework. Using the data callback framework, features that contribute to the computational requirements of each step for synthesizing a PCB and/or package may be extracted for every run of the synthesis process in design synthesis. Using the data callback framework, time-to-run each step of the PCB/package synthesis (e.g., Proc A, Proc B) may be recorded along with the complexity features.

In some embodiments, the number of core hours that each step or process of PCB/package synthesis consumed (i.e. the compute requirements) may also be measured. Accordingly, computation process 10 allow for quantitative estimation of the computational requirements of synthesizing a new design by correlating design features (or complexity features) with computational requirements. Using a quantitative estimation of computational requirements, monetary cost may be generated. Additionally, using complexity features and the number of core hours, a machine learning model may be trained to accurately predict the computational requirements of a new design after extracting features.

In some embodiments, computational requirements prediction may include design files, scalar features, and runtime predictions. Examples of design files may include, but are not limited to, representations of component placements, via placements, and routing locations. Examples of scalar features may include, but are not limited to, board dimensions, wire length, number of nets, and number of packages vs. discrete components.

In some embodiments, the time-to-run data and the complexity features from process data collection may be used to construct and/or train a model for time-to-run as a function of complexity features for each step of the synthesis. In some embodiments, the model used to predict the time-to-run as a function of complexity features may include, but is not limited to, a machine learning model. The model for time-to-run as a function of complexity features may then be utilized to construct and/or train another model to predict the time it will take to synthesize a new board based on known complexity features. The model used to predict the time may include a regression or a machine learning model. The predicted time may then be used to predict the computational requirements of a new design, cost, and/or a price estimate for the synthesis. Additional information regarding constructing or training machine learning models may be found in application Ser. No. 16/785,972, which is incorporated herein by reference in its entirety.

In design space optimization, there are a plethora of strategies that may be used to optimize a current design into a more favorable region based upon a certain metric. Most of these optimization methods are referred to as "blackbox" strategies because there is not a human-interpretable model to how the new designs are being found. Not only are the methods not interpretable, but it is also difficult to predict what the runtime of these algorithms. Complexity estimates are completely dependent on the application and sometimes even the specific instance of the general problem being solved.

In some embodiments, process data collection may utilize domain-specific data collected on systems, such as design synthesis, to learn relationships between the problem input parameters to the runtime of the algorithm. Domain-specific data generally refers to the data that may be collected from instrumenting the design synthesis processes such as the core-hours and hyper-parameters for placement/via/routing and may include some of the complexity features discussed herein. Domain-specific knowledge for blackbox optimization may be used for runtime estimation in computational requirements prediction.

In some embodiments, the design synthesis process discussed herein may utilize genetic optimization as the algorithm for training models on. For example, the model for time-to-run and as a function of complexity features may utilize a genetic optimization. Genetic optimization defines a population of individuals that express a certain "chromosome" in order to be graded with a fitness value. The chromosomes are a representation of the designs, and the fitness value is an evaluation metric that helps guide the population into better regions of design space. For example, chromosomes may be time-to-run and complexity features. Additional information regarding genetic optimization processes may be found in application Ser. No. 16/898,702, which is incorporated herein by reference in its entirety.

In some embodiments, the procedure may be run for either a fixed number of iterations (to guarantee an approximate runtime) or may be run until the change in fitness value stagnates for a certain amount of time. While a fixed number of iterations helps bound the runtime of the algorithm, the amount of iterations needed is highly dependent on the problem instance, hyperparameters, and initialization procedure. Process data collection may collect data for a variety of instance types and sizes in order to train a network that learns useful features to generalize. Examples of data in each design used for training models may include, but are not limited to, board area, total component area, number of pins, number of connections, nets, and rules. The optimization may then be run to convergence where the timings are collected weighted by the number of cores used by that specific process.

In some embodiments, the framework exemplified in flowchart 600 may be applied to determine the computation requirement of a new design based on the model trained with past data collected with other designs. The model and the past data include those described hereinabove. The computation requirement may include the "core-hours" and the parameters for the synthesis processes.

Figure 7:
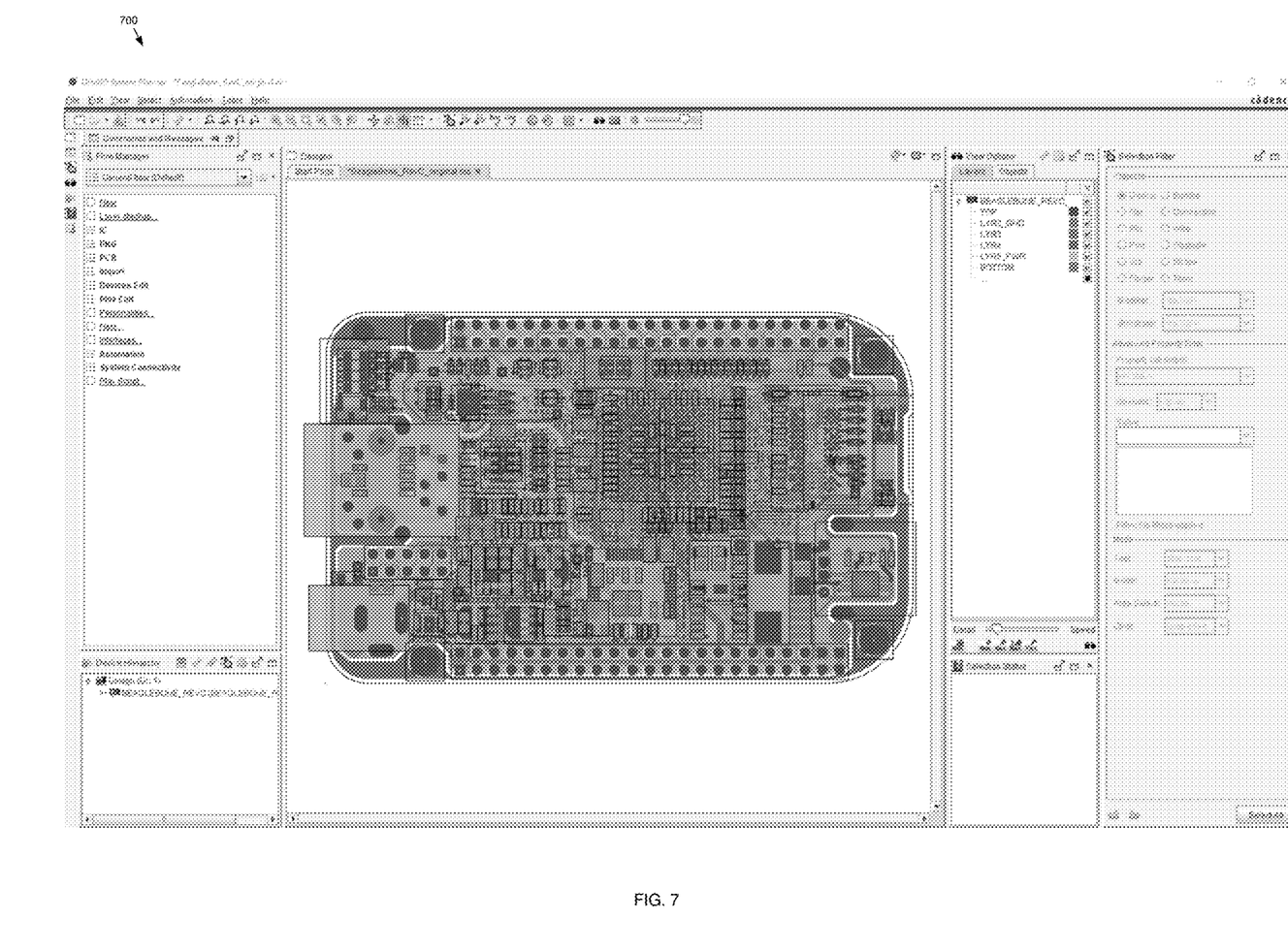
FIG. 7 is a graphical user interface showing an example screenshot of computation process in accordance with an embodiment of the present disclosure.

Referring now to FIG. 7, a screenshot of an example graphical user interface 700 is provided. GUI 700 displays an EDA application 20 including PCB design software that allow users to do perform PCB design synthesis manually and/or automatically using the teachings of computation process 10 discussed herein. The example provided in FIG. 7 shows a completely synthesized PCB design.

In some embodiments, the inference engine included herein may provide one or more parameters for the synthesis engine so that it may run the synthesis algorithms/processes (e.g., placement, via, routing, metal-pouring, etc.) efficiently with cloud computing resources. Some parameters may include, but are not limited to, maximum runtime, maximum iterations, number of cores, as is discussed in further detail below.

In some embodiments, most of the algorithms/processes associated with the synthesis engine may attempt to run indefinitely trying to find an optimal solution. Accordingly, computation process 10 may use parameters such as maximum runtime or maximum iterations to limit the time budget of these processes. Setting the limit too low may deliver sub-optimal results and setting limit too high may waste time and resources. The inference engine included herein may attempt to infer the "best" runtime/iteration limits for these processes such that they provide good results without wasting excessive time/resources. Most of the algorithms/processes may also utilize multiple computer cores to gain performance. In operation, the inference engine may infer the proper number of computer cores that are "best" for the processes, as opposed to simply using the maximum number of cores. Although certain parameters are discussed above it should be noted that any suitable parameter may be used, and other process-specific parameters may be used, without departing from the scope of the present disclosure.

Figure 8:
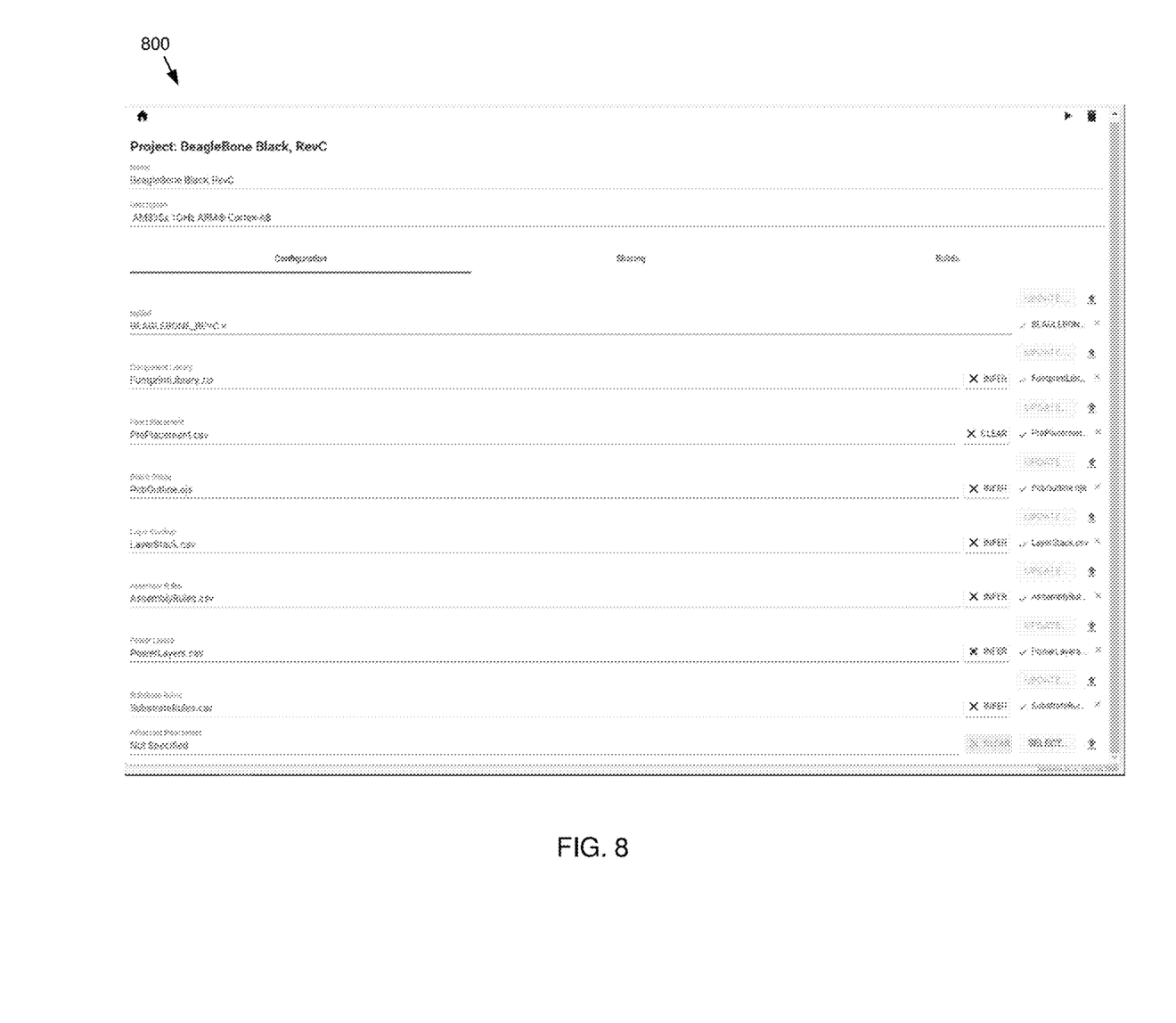
FIG. 8 is a graphical user interface showing an example screenshot of computation process in accordance with an embodiment of the present disclosure.
Figure 9:
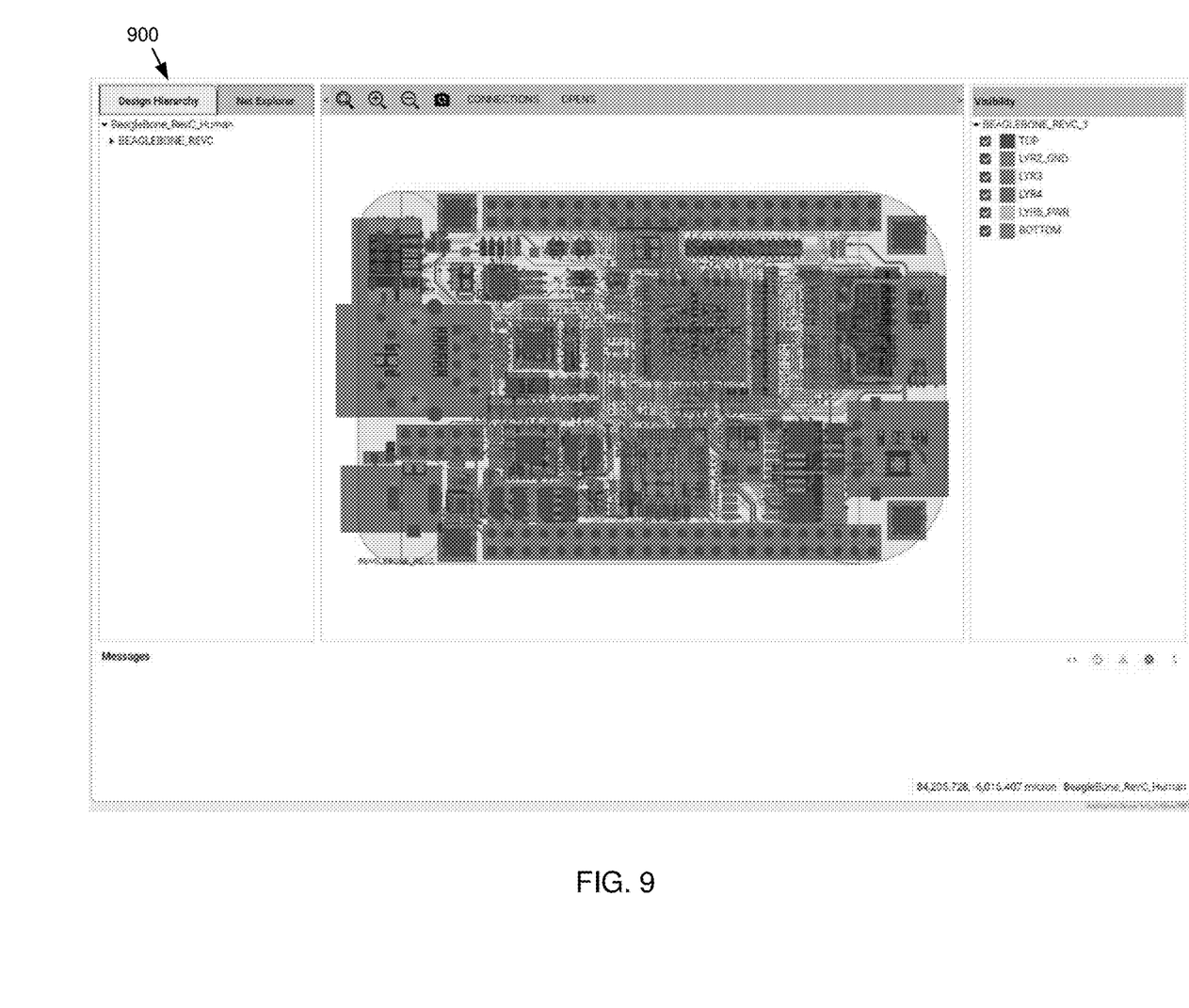
FIG. 9 is a graphical user interface showing an example screenshot of computation process in accordance with an embodiment of the present disclosure.

Referring now to FIGS. 8-9, screenshots showing examples of graphical user interfaces consistent with embodiments of computation process 10 are provided. FIG. 8 shows an example of a web interface where a user can upload a design input file and supporting configuration files. The supporting configuration files may be optional as the system may be configured to generate them if the user chooses not to upload them.

In some embodiments, the "Netlist" file may define the logical connection of the components, the "Component Library" file may define the physical geometries of the components, the "Fixed Placement" file may allow the user to specify fixed locations for some or all of the components, the "Board Shape" file may specify the overall PCB geometry of the design, and the "Layer Stackup" file may allow the user to limit the number of layers and their property of the PCB. Once the files are uploaded, the computation process 10 may then use the user uploaded file to infer the parameters for the design synthesis processes. And the design synthesis processes (as shown in FIG. 3) may run with these parameters. Once the synthesis processes finish, the design can be rendered in a web interface shown in FIG. 9. This allows the users to visually and interactively examine the synthesized design.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer implemented method associated with a printed circuit board ("PCB") design, comprising:
   receiving, using a processor, one or more PCB electronic design files;
   determining whether the PCB electronic design files include data required for a synthesis engine;
   inferring one or more parameters using an inference engine;
   providing the one or more parameters to the synthesis engine, wherein the synthesis engine includes a placement, via assignment, routing, and metal pouring process;
   collecting process data from at least one of the placement, via assignment, routing, and metal pouring process; and
   training a machine learning system using the process data to predict compute resources in response to a new input.

2. The computer implemented method of claim 1, wherein the process data from the placement process includes at least one of a number of components, a number of connections, a number of cores, a board area, and a sum of component footprints.

3. The computer implemented method of claim 1, wherein the process data from the via process includes at least one of a number of connections, a number of layers, and a number of cores.

4. The computer implemented method of claim 1, wherein the process data from the routing process includes at least one of a number of connections, a number of layers, and a number of cores.

5. The computer implemented method of claim 1, wherein the process data from the metal pouring process includes at least one of a board area, a number of power and ground nets, a number of power and ground layers, and a number of cores.

6. The computer implemented method of claim 1, wherein receiving includes receiving one or more of a netlist, a component library, a board outline, and a rules file.

7. The computer implemented method of claim 1, wherein data required for a synthesis engine includes at least one of a netlist, a board outline, a component library, a layer stackup, and one or more rules associated with signal integrity, clearances, and trace widths.

8. The computer implemented method of claim 1, wherein the one or more parameters includes at least one of a maximum time limit, a maximum iteration limit, a number of cores or machines required, and other process-specific parameters.

9. A non-transitory computer readable medium having stored thereon instructions, which when executed by a processor result in one or more operations, the operations comprising:
- receiving, using a processor, one or more PCB electronic design files;
- determining whether the PCB electronic design files include data required for a synthesis engine;
- inferring one or more parameters using an inference engine;
- providing the one or more parameters to the synthesis engine, wherein the synthesis engine includes a placement, via assignment, routing, and metal pouring process;
- collecting process data from at least one of the placement, via assignment, routing, and metal pouring processes; and
- training a machine learning system using the process data to predict compute resources in response to a new input.

10. The computer readable medium of claim 9, wherein the process data from the placement process includes at least one of a number of components, a number of connections, a number of cores, a board area, and a sum of component footprints.

11. The computer readable medium of claim 9, wherein the process data from the via process includes at least one of a number of connections, a number of layers, and a number of cores.

12. The computer readable medium of claim 9, wherein the process data from the routing process includes at least one of a number of connections, a number of layers, and a number of cores.

13. The computer readable medium of claim 9, wherein the process data from the metal pouring process includes at least one of a board area, a number of power and ground nets, a number of power and ground layers, and a number of cores.

14. The computer readable medium of claim 9, wherein receiving includes receiving one or more of a netlist, a component library, a board outline, and a rules file.

15. The computer readable medium of claim 9, wherein data required for a synthesis engine includes at least one of a netlist, a board outline, a component library, a layer stackup, and one or more rules associated with signal integrity, clearances, and trace widths.

16. The computer readable medium of claim 9, wherein the one or more parameters includes at least one of a maximum time limit, a maximum iteration limit, a number of cores or machines required, and other process-specific parameters.

17. A system associated with a printed circuit board ("PCB") design, comprising:
- a processor configured to receive one or more PCB electronic design files and to determine whether the PCB electronic design files include data required for a synthesis engine, the processor further configured to infer one or more parameters using an inference engine, the processor further configured to provide the one or more parameters to the synthesis engine, wherein the synthesis engine includes a placement, via assignment, routing, and metal pouring process, the processor further configured to collect process data from at least one of the placement, via assignment, routing, and metal pouring process, the processor further configured to train a machine learning system using the process data to predict compute resources in response to a new input.

18. The system of claim 17, wherein the process data from the placement process includes at least one of a number of components, a number of connections, a number of cores, a board area, and a sum of component footprints.

19. The system of claim 17, wherein the process data from the via process includes at least one of a number of connections, a number of layers, and a number of cores.

20. The system of claim 17, wherein the process data from the routing process includes at least one of a number of connections, a number of layers, and a number of cores.

* * * * *